Jan. 24, 1967  J. A. FISCHER ETAL  3,299,913
ADJUSTABLE TENSION WIRE GUIDE
Filed July 31, 1963

INVENTORS
JOSEPH A. FISCHER
HENRY G. DOMBROWSKI
BY
C. R. Meland
THEIR ATTORNEY

United States Patent Office 3,299,913
Patented Jan. 24, 1967

3,299,913
ADJUSTABLE TENSION WIRE GUIDE
Joseph A. Fischer and Henry G. Dombrowski, Hales Corners, Wis., granted to National Aeronautics and Space Administration under the provision of 42 U.S.C. 2457(d)
Filed July 31, 1963, Ser. No. 299,042
10 Claims. (Cl. 140—123)

This invention relates to an adjustable tension wire guide which is capable of guiding wire into slots in a coil form and which is provided with means for adjusting the tension of the wire being applied to the coil form.

One of the objects of this invention is to provide a wire winding device which uses the frictional properties of coated or uncoated wire spirally wound on a smooth cylindrical surface to obtain a means for providing winding wire tension. In carrying this object forward, the wire is spirally wound on a cylindrical member which may be formed, for example, of glass and the tension of the wire is varied by changing the number of turns of wire which are spirally wound on the smooth cylindrical member.

Another object of this invention is to provide a wire guide which has adjustable means for varying the number of turns of wire which are wound around a cylindrical member to vary the tension of the wire.

Still another object of this invention is to provide a wire guide which has means for adjusting the tension of the wire and wherein the wire is enclosed to protect the surface of the wire as it is being applied to a suitable coil form. By enclosing the wire in the wire guide, the wire is not handled by the operator and the wire therefore cannot be contaminated with grease, oil or other contaminants that might be deposited on the wire that might form a surface that would be detrimental to later processes such as epoxy encapsulation, molding and the like.

Still another object of this invention is to provide a wire guide which has a means for adjusting the tension of the wire and which is provided with means for indicating the amount of tension of the wire.

Further objects and advantages of the present invention will be apparent from the following description, reference being had to the accompanying drawings wherein preferred embodiments of the present invention are clearly shown.

Figure 1:
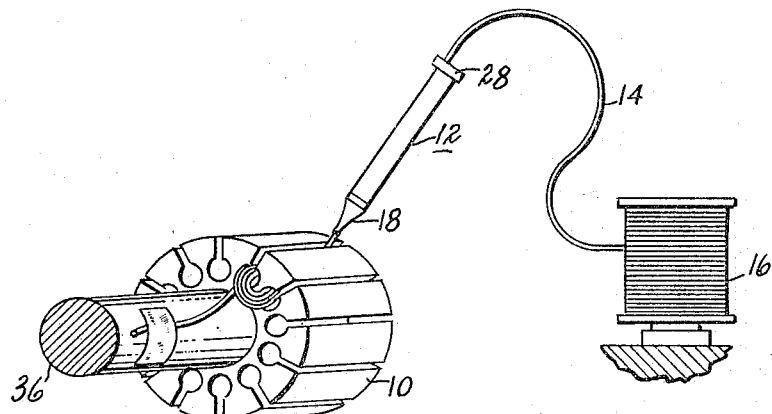
FIGURE 1 is a perspective view of a wire guide made in accordance with this invention and shown for use in applying coils of wire to a coil form.
Figure 2:
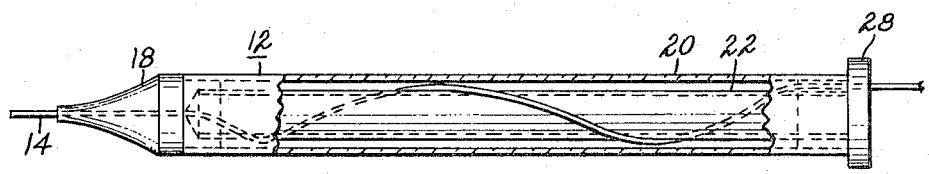
FIGURE 2 is a view partly in section of a wire guide made in accordance with this invention.

Referring now to the drawings and more particularly to FIGURE 1, a coil form which in this case is a stator for a dynamoelectric machine is illustrated which is designated by reference numeral 10. This stator has a plurality of slots which are to be filled with coils of wire. The coils of wire are applied to the slots of the stator 10 by the adjustable tension wire guide designated in its entirety by reference numeral 12. The wire guide 12 is fed with wire 14 from a source of supply which takes the form of a spool or de-reeler 16. The wire is applied to the slots through a guide tip 18 which is more fully described hereinafter. The wire guide 12 can be used manually by simply grasping it with the hand or it can be moved by a machine if so desired in the correct path to apply coils of wire to a pair of slots.

Figure 3:
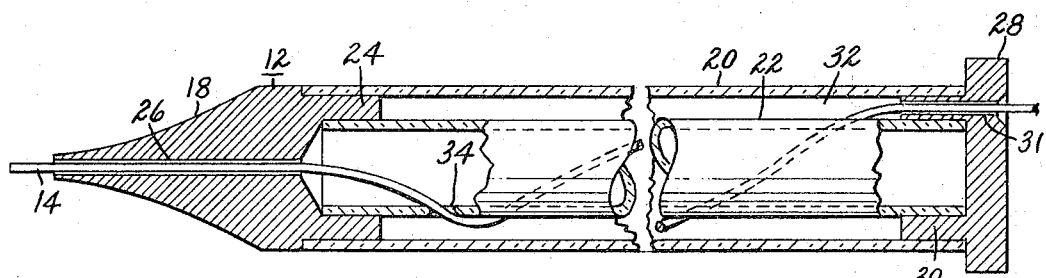
FIGURE 3 is an enlarged sectional view of the wire guide illustrated in FIGURE 2.
Figure 4:
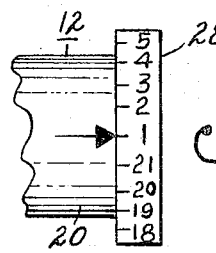
FIGURE 4 is an enlarged view of a portion of the wire guide illustrating one method of indicating the wire tension.

Referring now more particularly to FIGURES 3 and 4, it is seen that the wire guide 12 includes outer and inner tubular parts 20 and 22. It is important that the outer cylindrical surface of part 22 be smooth and for this reason the tubular part 22 is preferably formed of a glass material. The tubular part 20 may likewise be formed of a glass material and the ends of the parts 20 and 22 are secured to the nozzle 18 in any well known manner. One pair of ends of the tubular parts 20 and 22 are positioned on an opposite side of the annular portion 24 of the nozzle 18. The guide tip 18 may be formed of metal material and it is seen that this guide tip has a central aperture 26 which can receive the wire 14 being fed through the wire guide. The longitudinal axis of the smooth bored hole 26 coincides substantially with the longitudinal axis of the tubular part 22.

The wire guide of this invention has an adjustable plug 28 including an integral annular section 30 which fits between the ends of the tubular parts 20 and 22. The part 28 is rotatable with respect to the parts 20 and 22 and has a slot 31 which is generally parallel to the longitudinal axis of the wire guide. This slot receives the wire 14 as is clearly depicted in the drawings. The slot 31 remains in alignment with the space 32 formed by the tubular parts 20 and 22 during its rotation to various positions.

The tubular part 22 which is formed of glass material has a smooth bored hole 34, the axis of which is located substantially normal to the longitudinal axis of the tubular part 22.

When using the wire guide of this invention, the wire is fed through the opening 31 in the adjustable plug 28. The wire is spirally wound around the outer periphery of the glass tube 22 and then is passed through the opening 34 in the glass tube. The wire is then fed through central opening 26 of the guide tip 18 and the wire guide is then ready for use in applying wire to a coil form.

In applying wire to a coil form, one end of the wire 14 is fixed as by taping the wire to a fixed support 36 shown in FIGURE 1. The plug or knob 28 is then rotated to wind the wire spirally around the outer surface of the tubular part 22. If it is desired to increase the tension of the wire, the knob or plug 28 is rotated in such a direction as to increase the number of turns of spirally wound wire engaging the outer surface of the tubular part 22. If it is desired to decrease the tension, the part 28 is rotated in an opposite direction to unwind turns of wire from the outer surface of the tubular part 22.

In order to indicate the amount of tension of the wire, the part 20 can be provided with an arrow and the adjustable knob 28 can be provided with suitable markings or numbers which will indicate to the operator the amount of tension being set by rotation of the knob 28. This is depicted in FIGURE 4 and it is apparent that the arrow might be put on part 28 and the numbers on part 20 if so desired.

When the proper wire tension has been adjusted and when one end of the lead has been taped or otherwise secured to a stationary part, the wire guide 12 is grasped by the hand and then moved in the slots of the coil form 10 to apply coils of wire to the slots. As the wire guide 12 is moved either by hand or by a machine, the wire is progressively fed through the wire guide and the proper tension is provided due to the fact that the wire is wound spirally around the outer surface of the tubular part 22 and is in frictional engagement with this outer surface. It will, of course, be appreciated that the more wire that engages the outer surface of the part 22, the greater tension is provided and for this reason, the tension is regulated or set by rotating the knob 28 to vary the number of turns spirally wound on the outer surface of the tubular part 22.

It will be appreciated that the wire guide of this invention provides a means for manually applying wire to a coil form without direct contact between the hands of the operator and the wire. In addition, the wire guide of this invention provides a simple and exact method of varying the tension of the wire as it is being applied to a coil form. This device is useful in applying wire to a coil form that has a coated insulation bonded to it or can be used with uncoated wire.

While the embodiments of the present invention as herein disclosed, constitute a preferred form, it is to be understood that other forms might be adopted.

What is claimed is:

1. An adjustable tension wire guide comprising, a tubular member having an outer cylindrical surface, said tubular member having an opening in one wall thereof which forms a feed-through opening for wire that is adapted to be applied to a coil form, and a member adjustable relative to said tubular member, said adjustable member having a slot means for receiving wire that is fed through said wire guide, said adjustable member being capable of winding or unwinding turns of wire on the outer surface of said tubular member to vary the tension of wire being fed through said wire guide, said wire guide having an outlet opening aligned with the interior of said tubular member for receiving wire passing through said opening in said wall of said tubular member.

2. The wire guide according to claim 1 wherein the tubular member is formed of glass material.

3. The wire guide according to claim 1 wherein the opening in the tubular member is located substantially radially of the longitudinal axis of the tubular member and wherein the slot in the adjustable member has an axis which is substantially parallel to the longitudinal axis of the tubular member.

4. An adjustable tension wire guide comprising, a tubular member having an outer cylindrical surface, a guide tip having a central opening communicating with the interior of said tubular member, an opening in one wall of said tubular member for feeding wire to the central opening of said guide tip from an outer surface of said tubular member, and means for guiding wire against the outer surface of said tubular member, said last-named means being adjustable relative to the outer surface of said tubular member for winding and unwinding coils of wire on said outer surface of said tubular member.

5. The wire guide according to claim 4 wherein the adjustable means has an opening for feeding wire into the wire guide and in engagement with the outer surface of the tubular member.

6. An adjustable tension wire guide comprising, a guide tip having an opening, inner and outer tubular members having ends engaging said guide tip, said inner and outer tubular members defining an annular longitudinally extending chamber, the interior of said inner tubular member communicating with said opening in said guide tip, an opening in the wall of said inner tubular member communicating with said chamber and providing a feed passage for wire passing through the opening of said guide tip, an adjustable member adjustable relative to said inner and outer tubular members, said adjustable member having an opening for feeding wire into said chamber and in engagement with the outer periphery of said inner tubular member, said adjustable member being capable of winding and unwinding coils of wire on the outer periphery of said inner tubular member to vary the tension of said wire as it is fed through said wire guide.

7. The wire guide according to claim 6 wherein the opening in the inner tubular member is substantially radial and wherein the opening in said adjustable member has an axis which is substantially parallel with the longitudinal axis of said tubular members.

8. An adjustable tension wire guide comprising, a tubular member having an outer cylindrical surface, a guide tip having an opening communicating with the interior of said tubular member, an opening in one wall of said tubular member for feeding wire through the interior of said tubular member and into the opening formed in said guide tip, said wire being adapted to be wound around said tubular member and in engagement with its outer cylindrical surface, adjustable means rotatable with respect to said tubular member, said adjustable means having an opening for feeding wire around the outer periphery of said tubular member and being capable of adjusting the number of turns of wire engaging the outer cylindrical surface of said tubular member, and means enclosing the outer cylindrical surface of said tubular member to protect said wire when it is being fed through said wire guide.

9. The wire guide according to claim 8 wherein the tubular member is formed of glass material.

10. The wire guide according to claim 8 wherein the opening in the guide tip has an axis which substantially coincides with the longitudinal axis of the tubular member.

References Cited by the Examiner

UNITED STATES PATENTS

| 31,960 | 4/1861 | De Forest | 242—153 |
|---|---|---|---|
| 609,106 | 8/1898 | Lauritsen | 242—154 |
| 1,011,986 | 12/1911 | Migliora et al. | 242—153 |
| 1,049,361 | 1/1913 | Holmes | 140—123 |
| 1,997,709 | 4/1935 | Williams | 242—154 |
| 2,474,463 | 6/1949 | Burrell | 140—123 |
| 2,798,681 | 7/1957 | Beverino | 242—153 |

CHARLES W. LANHAM, *Primary Examiner.*

BENJAMIN A. BORCHELT, *Examiner.*

L. A. LARSON, *Assistant Examiner.*